Jan. 8, 1924.

O. N. ANDERSON

PORTABLE ELECTRIC HEATER

Filed Oct. 3, 1922

Oliver N. Anderson, INVENTOR.

BY Geo. P. Kimmel

ATTORNEY.

Patented Jan. 8, 1924.

1,480,362

UNITED STATES PATENT OFFICE.

OLIVER N. ANDERSON, OF MINNEAPOLIS, MINNESOTA, ASSIGNOR OF ONE-HALF TO E. S. VAN KOUGHNET, OF ST. PAUL, MINNESOTA, AND ONE-HALF TO RALPH PARKER, OF MINNEAPOLIS, MINNESOTA.

PORTABLE ELECTRIC HEATER.

Application filed October 3, 1922. Serial No. 592,093.

*To all whom it may concern:*

Be it known that I, OLIVER N. ANDERSON, a citizen of the United States, residing at Minneapolis, in the county of Hennepin and State of Minnesota, have invented certain new and useful Improvements in Portable Electric Heaters, of which the following is a specification.

This invention relates to improvements in portable electric heaters and has for its object to provide a heater of such class, in a manner as hereinafter set forth, for radiating the heat in an upward direction as well as heating the upper portion of the device.

A further object of the invention is to provide a portable electric heater, in a manner as hereinafter set forth whereby the lower portion of the heater will be cool at all times and to further construct the heater, in a manner as hereinafter set forth, to create an induce current of cold air, when the heater is operated traveling from the lower portion to the upper heated portion of the device.

A further object of the invention is to provide a portable heater, in a manner as hereinafter set forth, with a support for the heating element, said support acting as a means for coupling the elements of the device together.

Further objects of the invention are to provide a portable electric heater which is simple in its construction and arrangement, strong, durable, efficient and convenient in its use, readily assembled, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 2 is a section on line 3—3, Figure 1,

Figure 1:
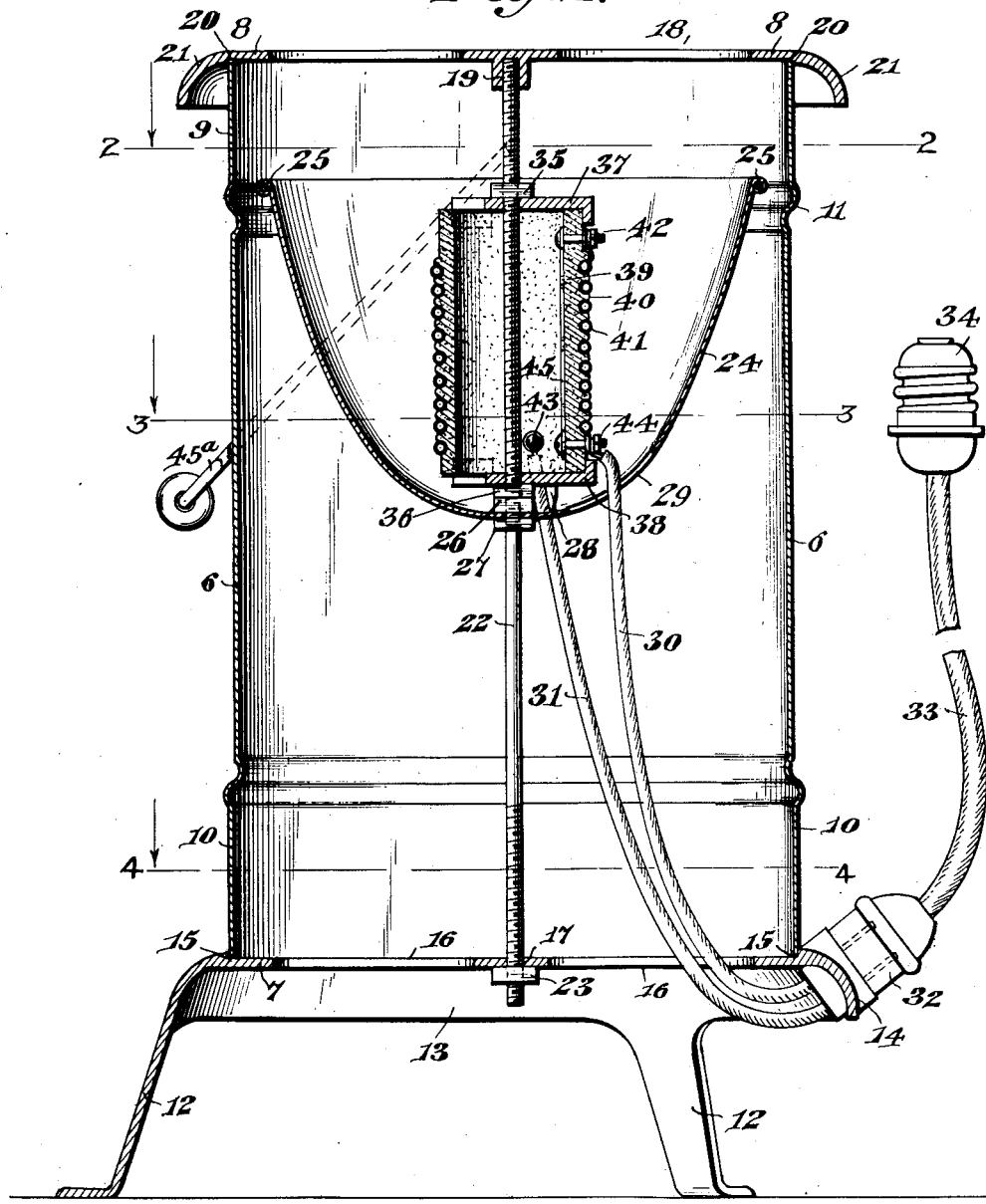
Figure 1 is a vertical sectional view of a portable electric heater, in accordance with this invention.
Figure 2:
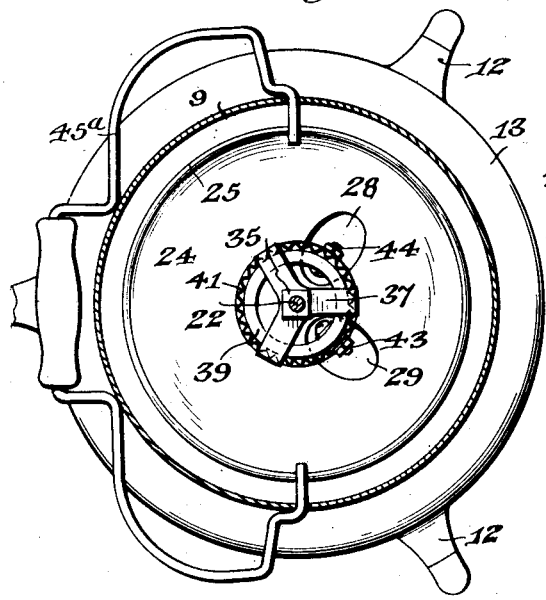
Figure 2 is a section on line 2—2, Figure 1.
Figure 3:
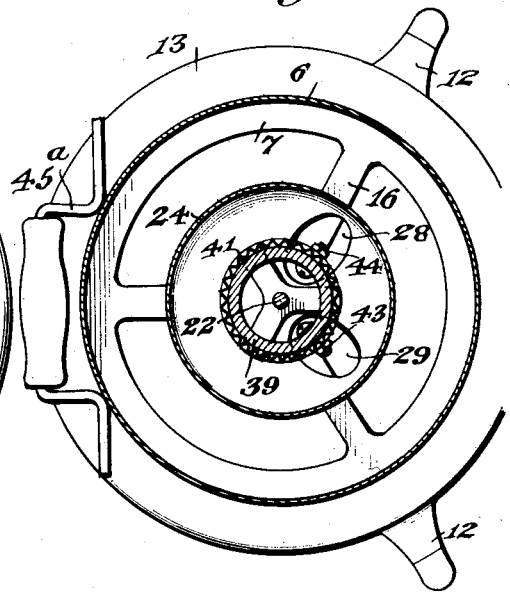
Figure 4:
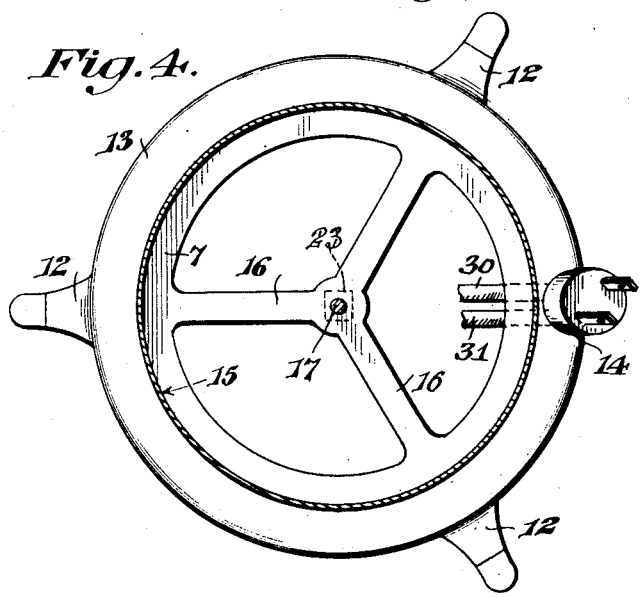
Figure 4 is a section on line 4—4, Figure 1.
Figure 5:
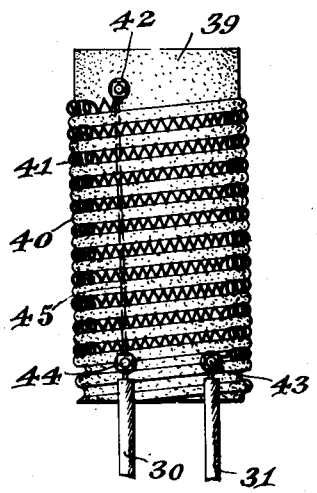
Figure 5 is an elevation of a heating element.

Referring to the drawings in detail, a portable electric heater in accordance with this invention, comprises a body portion 6, a base 7, and a top 8. The body portion 6, is in the form of a shell and has its upper portion offset as at 9, with respect to the intermediate portion of the shell, and also has its lower portion offset as at 10, with respect to the intermediate portion. The body portion 6, intermediate its ends, is beaded as at 11, for reinforcing as well as ornamental purposes.

The base 7, is circular in contour and includes a series of supporting legs 12, and also formed with a depending continuous flange 13, the latter is provided with an opening 14. The upper face of the base 7, has the marginal portion thereof formed with a vertically disposed annular shoulder 15, against which is positioned the lower part 10, of the body portion 6. The base 7, is of skeleton contour, of spider-like formation and with the arms 16, of the spider formed integral at their inner termini, and with the connecting portions of the arms 16, provided with an opening 17, arranged centrally of the base 7.

The top 8, is of spider-like formation and with the arms thereof indicated at 18, which are formed integral with each other at their inner termini, and the connecting portions of the inner termini of the arms 18, are formed with a depending socket 19, arranged centrally with respect to the top 8. The lower face of the top 8, has a vertically disposed annular shoulder 20, against which abuts the upper part 9, of the portion 6, and said top 8, furthermore is provided with a depending flange 20, which surrounds the upper part 9, of the body 6, as well as extended therefrom.

The body portion 6, base 7, top 8, are coupled together through the medium of a vertically disposed holding rod 22, which extends up through the opening 17, and into the socket 19. The rod 22, has threaded engagement with the wall of the socket 19, and said rod 22, projects below the opening 17, and is provided with a lock nut 23, which bears against the lower face of the base 7, and by this arrangement the body portion 6, base 7 and top 8, are securely clamped together.

Arranged within the body portion 6, and extended upwardly from a point approximately centrally of the body portion 6, is a semi-oval shaped reflector 24, of less diameter throughout than the diameter of the body portion 6, thereby providing at the upper end of the reflector 24, and the body portion 6, a passage 25, for the air as it travels upward from the lower part of the heater. The reflector 24, is supported from the holder 22, by a pair of superposed nuts 26, 27, which is secured to the rod 22, and are arranged one above and the other below the reflector 24, as well as being in binding engagement therewith. The lower portion of the reflector 24, has a pair of openings 28, 29, for the circuit wires 30, 31, which lead from a plug 32, mounted in the opening 14, and the latter is attached by the conducting element 33, to a socket member 34, which can be connected to a source of electrical energy.

Carried by the rod 22, above the nut 26, is a pair of nuts 35, 36, which adjustably engage with the rod 22, and positioned against the nut 25, is a clamping element 37, in the form of flanged spider, and arranged against the nut 36, is a clamping element 38, in the form of a flanged spider. The clamping elements 37, 38, are oppositely disposed with respect to each other, and interposed between said elements 37, 38, as well as being clamped in position thereby, is the heating device, which consists of a hollow cylinder 39, having a peripheral spiral groove 40, and in which is positioned a coiled heating element 41, having one end connected to a binding post 42, supported by the cylinder 39, and its other end connected to a binding post 43, mounted in the cylinder 39. Supported by the cylinder 39, is a binding post 44, from which extends a conductor 45, the latter is attached to the binding post 42. The cylinder 39, is constructed of fire clay or any other suitable refractory material and the coiled heating element is formed from a non-corrosive silchrome wire which will stand a temperature of about 2000 degrees F. The conductor 30, is attached to the binding post 43, and the conductor 31, to the binding post 44.

The reflector 24, is constructed of copper and it incloses the heating device, to prevent the cold air, as it passes upwardly through the heater from coming in contact with the heating element.

The arrangement of the reflector 24, which provides the passage 25, is such as to cause the top 8, to become very hot and further provides for an induce current of cold air traveling from the lower to the upper portion of the heater and which will be continuous during the operation of the device. The top 8, becomes very hot and radiates the heat.

Attached to the body portion 6, is a bail 45, to provide for the positioning of the heater at any point desired.

The foregoing description taken in connection with the accompanying drawings provides for a novel, inexpensive and efficient electrical heater and although the preferred form of the invention is disclosed thereby, yet it is to be understood that changes in the details of construction can be resorted to without departing from the spirit of the invention.

What I claim is:—

1. A portable electric heater comprising a body portion, a top, a base, a holding element connecting said base, body portion and top together, a reflector secured to said element, a pair of clamping elements carried by the holding element, a cylinder of refractory material interposed between and secured in position by said clamping element, said cylinder inclosed by said reflector, an electric heating element mounted in the periphery of said cylinder, a socket supported by said base, and electrical conductors leading from said socket to said heating element.

2. An electric heater comprising a holding element, a pair of spaced clamping elements carried thereby, a peripherally grooved hollow cylinder interposed between and secured in position by said clamping elements, and a heating element mounted in the grooved periphery of said cylinder, and a reflector supported by said holding element and inclosing said cylinder.

3. An electric heater comprising a body portion, a holding element arranged therein, an upwardly directing reflector supported by the holding element within the body portion and of less diameter than the latter, a pair of flanged clamping elements connected to the holding element, a hollow cylinder of refractory material having a grooved periphery and interposed between and secured in position by said clamping elements, and a heating element mounted in the grooved periphery of said cylinder.

4. An electric heater comprising a body portion, a holding element arranged therein, an upwardly directing reflector supported by the holding element within the body portion and of less diameter than the latter, a pair of flanged clamping elements connected to the holding element, a hollow cylinder of refractory material having a grooved periphery and interposed between and secured in position by said clamping elements, a heating element mounted in the grooved periphery of said cylinder, a socket carried at the lower part of said body portion, and electric conductors leading from said socket to said heating element.

5. In an electric heater, a vertically disposed holding element, a hollow peripherally grooved cylinder formed of refractory material and having said element extending therethrough, clamping means connected to said element for fixedly securing said cylinder therewith, a heating element mounted in the grooved periphery of said cylinder, a binding post carried by the cylinder and having one end of said heating element connected therewith, a binding post carried by the cylinder and electrically connected to the other of said binding posts, a binding post carried by the cylinder and having the other end of said heating element connected therewith, and electrical conductors connected to certain of said binding posts.

6. In an electric heater, a vertically disposed holding element, a hollow peripherally grooved cylinder formed of refractory material and having said element extending therethrough, clamping means connected to said element for fixedly securing said cylinder therewith, a heating element mounted in the grooved periphery of said cylinder, a binding post carried by the cylinder and having one end of said heating element connected therewith, a binding post carried by the cylinder and electrically connected to the other of said binding posts, a binding post carried by the cylinder and having the other end of said heating element connected therewith, electrical conductors connected to certain of said binding posts, and a reflector carried by the holding element and surrounding and projecting above said cylinder.

7. An electric heater comprising a hollow peripherally grooved cylinder of refractory material, a coiled heating element mounted in the grooved periphery of the cylinder, a holding element, clamping elements for connecting the cylinder to the holding element, and electrical conductors arranged within said cylinder and leading to one end of the said heating element, an electrical conductor connected to that conductor arranged within the cylinder, and an electrical conductor leading to the other end of the heating element.

8. An electric heater comprising a hollow peripherally grooved cylinder of refractory material, a coiled heating element mounted in the grooved periphery of the cylinder, a holding element, clamping elements for connecting the cylinder to the holding element, electrical conductors arranged within said cylinder and leading to one end of the said heating element, an electrical conductor connected to that conductor arranged within the cylinder, an electrical conductor leading to the other end of the heating element, and a reflector connected with the holding element and inclosing said cylinder.

9. An electric heater comprising a hollow peripherally grooved cylinder of refractory material, a coiled heating element mounted in the grooved periphery of the cylinder, a holding element, clamping elements for connecting the cylinder to the holding element, electrical conductors arranged within said cylinder and leading to one end of the said heating element, an electrical conductor connected to that conductor arranged within the cylinder, an electrical conductor leading to the other end of the heating element, a reflector connected with the holding element and inclosing said cylinder, and means to provide a body portion inclosing and spaced from said reflector.

10. A portable electric heater comprising a top, a base, a body portion, a rod for connecting said base, body portion and top together, a heating device connected to said rod, a socket carried by said base, electrical connections between said socket and said heating device, and a reflector connected to said rod and inclosing said heating device and of less diameter than said body portion.

In testimony whereof, I affix my signature hereto.

OLIVER N. ANDERSON.